United States Patent
Ham et al.

(10) Patent No.: US 10,622,614 B2
(45) Date of Patent: Apr. 14, 2020

(54) CELL STRUCTURE FOR SECONDARY BATTERY AND SECONDARY BATTERY HAVING THE CELL STRUCTURE

(71) Applicant: Samsung Electronics Co., Ltd., Suwon-si, Gyeonggi-do (KR)

(72) Inventors: Dongjin Ham, Hwaseong-si (KR); Seungsik Hwang, Seongnam-si (KR); Jaeman Choi, Seongnam-si (KR); Moonseok Kwon, Hwaseong-si (KR); Minsang Song, Seongnam-si (KR)

(73) Assignee: SAMSUNG ELECTRONICS CO., LTD, Gyeonggi-Do (KR)

( * ) Notice: Subject to any disclaimer, the term of this patent is extended or adjusted under 35 U.S.C. 154(b) by 823 days.

(21) Appl. No.: 14/922,682

(22) Filed: Oct. 26, 2015

(65) Prior Publication Data

US 2016/0329546 A1 Nov. 10, 2016

(30) Foreign Application Priority Data

May 6, 2015 (KR) ........................ 10-2015-0063222

(51) Int. Cl.
*H01M 2/26* (2006.01)
*H01M 10/04* (2006.01)
*H01M 10/05* (2010.01)
*H01M 10/0585* (2010.01)

(52) U.S. Cl.
CPC ............. *H01M 2/26* (2013.01); *H01M 2/263* (2013.01); *H01M 2/266* (2013.01); *H01M 10/0436* (2013.01); *H01M 10/0486* (2013.01); *H01M 10/0585* (2013.01); *H01M 2220/30* (2013.01)

(58) Field of Classification Search
None
See application file for complete search history.

(56) References Cited

U.S. PATENT DOCUMENTS

| 4,830,940 A | * | 5/1989 | Keister | ................. | A61N 1/378 |
| | | | | | 429/128 |
| 5,154,989 A | * | 10/1992 | Howard | ................. | H01G 4/232 |
| | | | | | 429/160 |
| 6,641,027 B2 | * | 11/2003 | O'Connell | ............. | B23K 20/10 |
| | | | | | 228/1.1 |
| 9,325,028 B2 | * | 4/2016 | Kwon | ...................... | H01M 2/08 |

(Continued)

FOREIGN PATENT DOCUMENTS

JP 2012009308 1/2012
KR 1020000021401 A 4/2000

(Continued)

OTHER PUBLICATIONS

Extended European Search Report for application No. 16168484.0 dated Jul. 13, 2016.

*Primary Examiner* — Jonathan Crepeau
*Assistant Examiner* — Angela J Martin
(74) *Attorney, Agent, or Firm* — Cantor Colburn LLP

(57) ABSTRACT

A cell structure for a secondary battery includes an electrode assembly including a plurality of electrodes, a plurality of electrode tabs extending from the electrodes to an outside of the electrode assembly, and a plurality of lead tabs electrically connected to the electrode tabs and contacting the electrode assembly. In the cell structure, a part of each of the lead tabs is folded, and the electrode tabs are inserted into the folded part of each of the lead tabs.

16 Claims, 15 Drawing Sheets

(56) References Cited

U.S. PATENT DOCUMENTS

2007/0196732 A1    8/2007   Tatebayashi et al.
2011/0244312 A1*   10/2011   Tani ........................ H01M 2/26
                                                                               429/163
2014/0079979 A1    3/2014   Kwon et al.

FOREIGN PATENT DOCUMENTS

| KR | 2000021401 | * | 2/2001 | ............. H01M 2/26 |
| --- | --- | --- | --- | --- |
| KR | 1020070104689 A | | 10/2007 | |
| KR | 1020090064021 A | | 6/2009 | |
| KR | 1020120030935 A | | 3/2012 | |
| KR | 1020130119700 A | | 11/2013 | |
| KR | 1020140035689 A | | 3/2014 | |
| KR | 101502763 B1 | | 3/2015 | |

\* cited by examiner

CELL STRUCTURE FOR SECONDARY BATTERY AND SECONDARY BATTERY HAVING THE CELL STRUCTURE

CROSS-REFERENCE TO RELATED APPLICATION

This application claims priority to Korean Patent Application No. 10-2015-0063222, filed on May 6, 2015, and all the benefits accruing therefrom under 35 U.S.C. § 119, the content of which in its entirety is herein incorporated by reference.

BACKGROUND

1. Field

The disclosure relates to a cell structure for a second battery and a secondary battery including the cell structure.

2. Description of the Related Art

Secondary batteries have increasingly received attention with development of technology for electronic apparatuses. Recently, electronic apparatuses that are variously deformable in shapes thereof, e.g., flexible or wearable electronic apparatuses, are being developed. Accordingly, a research for a structure of a secondary battery for supplying electric power to such electronic apparatuses is performed.

SUMMARY

When a secondary battery having no flexibility is used for a flexible electronic apparatus, stress generated due to an external environment concentrates on an electrode or a connection portion in a secondary battery such that the electrode may be cut off or the connection portion is short-circuited, and thus durability of a secondary battery may be degraded.

Exemplary embodiments of the invention relate to a cell structure for a second battery having flexibility and a secondary battery including the cell structure.

According to an exemplary embodiment of the invention, a cell structure for a secondary battery includes an electrode assembly including a plurality of electrodes, a plurality of electrode tabs extending from the electrodes to the outside of the electrode assembly, and a plurality of lead tabs electrically connected to the electrode tabs and contacting the electrode assembly.

In an exemplary embodiment, the cell structure for a secondary battery may further include a fixing unit which fixes the lead tabs to a contact surface of the electrode assembly contacting the lead tabs.

In an exemplary embodiment, a part of each of the lead tabs may be folded and the electrode tabs may be inserted into the folded part of each of the lead tabs.

In an exemplary embodiment, each of the electrode tabs may be folded at least once.

In an exemplary embodiment, the electrode assembly may include a flexible material.

In an exemplary embodiment, the cell structure may further include an insulation layer disposed on a contact surface of the electrode assembly contacting the lead tabs.

In an exemplary embodiment, each of the electrode tabs may have a width less than about 50% of a width of the electrode assembly, and each of the lead tabs may have a width equal to or less than about 25% of the width of the electrode assembly.

In an exemplary embodiment, the electrodes may include a first electrode and a second electrode, which are alternately stacked one on another, and the electrode assembly may further include a separation film disposed between the first electrode and the second electrode.

In an exemplary embodiment, the electrode tabs may include a first electrode tab extending from the first electrode and a second electrode tab extending from the second electrode, and the lead tabs may include a first lead tab electrically connected to the first electrode tab and a second lead tab electrically connected to the second electrode tab.

In an exemplary embodiment, the first lead tab and the second lead tab may be in contact with a same surface of the electrode assembly.

In an exemplary embodiment, the first lead tab and the second lead tab may be in contact with different surfaces of the electrode assembly, respectively.

In an exemplary embodiment, at least one of the first electrode, the second electrode and the separation film may be partially bound by a binding member.

According to another exemplary embodiment of the invention, a cell structure for a secondary battery includes an electrode assembly including a plurality of electrodes, a plurality of electrode tabs extending from the electrodes to an outside of the electrode assembly, and a plurality of lead tabs electrically connected to the electrode tabs, in which a part of each of the lead tabs is folded and the electrode tabs are inserted into the folded part of each of the lead tabs.

In an exemplary embodiment, the lead tabs may be in contact with the electrode assembly.

In an exemplary embodiment, the cell structure for a secondary battery may further include a fixing unit which fixes the lead tabs to a contact surface of the electrode assembly contacting the lead tabs.

In an exemplary embodiment, each of the electrode tabs may be folded at least once.

According to another exemplary embodiment of the invention, a secondary battery includes an exterior member and a cell structure disposed in the exterior member, in which the cell structure includes an electrode assembly including a plurality of electrodes, a plurality of electrode tabs extending from the electrodes to an outside of the electrode assembly, and a plurality of lead tabs electrically connected to the electrode tabs and contacting the electrode assembly.

In an exemplary embodiment, the secondary battery may further include a fixing unit which fixes the lead tabs to a contact surface of the electrode assembly contacting the lead tabs.

In an exemplary embodiment, a part of each of the lead tabs may be folded and the electrode tabs may be inserted into the folded part of each of the lead tabs.

In an exemplary embodiment, each of the electrode tabs may be folded at least once.

BRIEF DESCRIPTION OF THE DRAWINGS

These and/or other features of the invention will become apparent and more readily appreciated from the following description of the exemplary embodiments, taken in conjunction with the accompanying drawings, in which.

DETAILED DESCRIPTION

Figure 1:
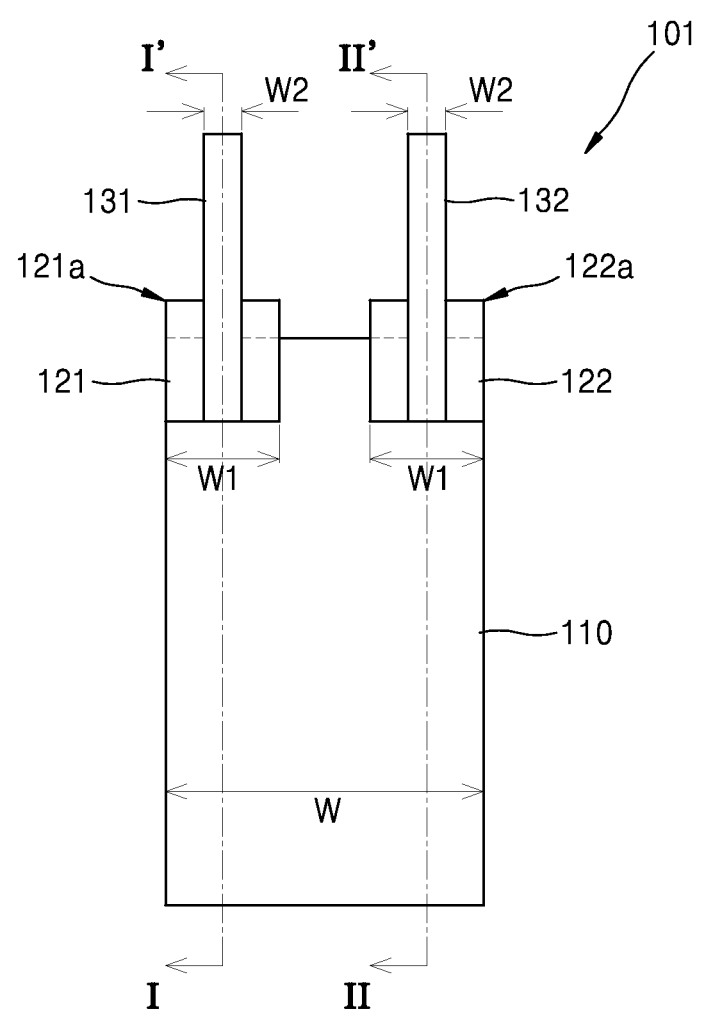
FIG. 1 is a plan view of a cell structure for a secondary battery according to an exemplary embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Reference will now be made in detail to exemplary embodiments, examples of which are illustrated in the accompanying drawings, in which like reference numerals refer to like elements throughout. The thickness or size of each layer illustrated in the drawings may be exaggerated for convenience of explanation and clarity.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Since a material forming each layer in the following exemplary embodiments is exemplary, other materials may be used therefor. As used herein, expressions such as "at least one of," when preceding a list of elements, modify the entire list of elements and do not modify the individual elements of the list. Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

Figure 2:
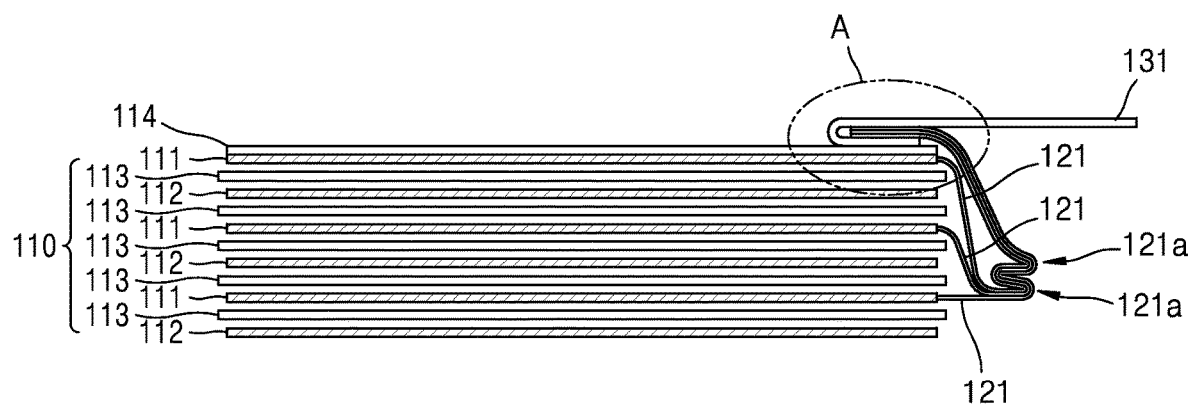
FIG. 2 is a cross-sectional view taken along line I-I' of FIG. 1.
Figure 3:
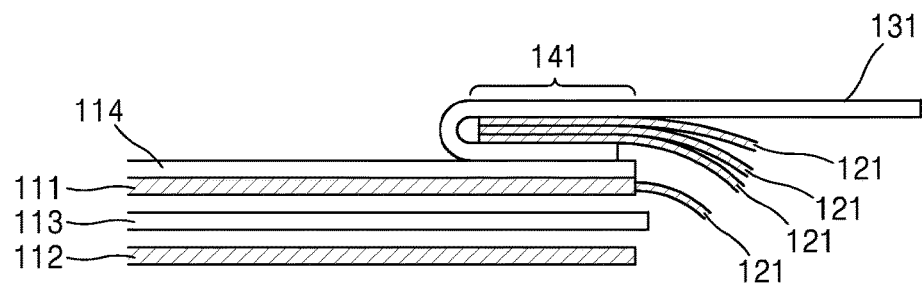
FIG. 3 is an enlarged view of a portion A of FIG. 2.
Figure 4:
FIG. 4 is a cross-sectional view taken along line II-II' of FIG. 1.

FIG. 1 is a plan view of a cell structure for a secondary battery according to an exemplary embodiment of the invention. FIG. 2 is a cross-sectional view taken along line I-I' of FIG. 1. FIG. 3 is an enlarged view of a portion A of FIG. 2. FIG. 4 is a cross-sectional view taken along line II-II' of FIG. 1.

Referring to FIGS. 1 to 4, an exemplary embodiment of a cell structure 101 for a secondary battery may include an electrode assembly 110, electrode tabs 121 and 122 extending to outside of the electrode assembly 110, and lead tabs 131 and 132 connected to the electrode tabs 121 and 122.

The electrode assembly 110 may include a plurality of first electrodes 111 and a plurality of second electrodes 112, which are alternately disposed one on another, and a plurality of separation films 113 disposed between the first electrodes 111 and the second electrodes 112. Although FIGS. 1 to 4 exemplarily illustrate that the number of each of the first and second electrodes 111 and 112 is three, the invention is not limited thereto. In one alternative exemplary embodiment, for example, the number of each of the first and second electrodes 111 and 112 may be one or more. The first and second electrodes 111 and 112 and the separation films 113, which collectively define the electrode assembly 110, may be flexible or include a flexible material to be bendable. Accordingly, the electrode assembly 110 may have a feature of flexibility. However, the invention is not limited thereto, and the electrode assembly 110 may have a feature of rigidity. Generally, the flexibility of a material may be defined by a Young's modulus (i.e., a tensile strength) and the flexibility of a sheet, an electrode or a film may be defined by a Specific Flexure Rigidity ($=Et^3/12$). E is a Young's Modulus and t is the thickness of a sheet. Herein, a material having flexibility means that the material may each independently have a Young's modulus (i.e., a tensile strength) of about 0.01 gigapascal (GPa) to about 300 GPa, e.g., about 0.05 GPa to about 220 GPa. Herein, a sheet, an electrode or a film having flexibility means that the sheet may each independently have a Specific Flexure Rigidity of about $1.04 \times 10^{-10}$ to about $1.2 \times 10^{-1}$ Nm, e.g., about $8.33 \times 10^{-10}$ to about $9.75 \times 10^{-3}$ Nm, or about $1.15 \times 10^{-9}$ to $2.6 \times 10^{-3}$ Nm.

Any one of the first electrode 111 and the second electrode 112 may be a positive electrode and the other one thereof may be a negative electrode. In an exemplary embodiment, when the first electrode 111 is a positive electrode, the second electrode 112 may be a negative electrode. Alternatively, when the first electrode 111 is a negative electrode, the second electrode 112 may be a positive electrode.

The first electrode 111 may include a first electrode collector (not shown) and a first electrode active material layer (not shown) disposed or formed on at least one surface of the first electrode collector. The second electrode 112 may include a second electrode collector (not shown) and a second electrode active material layer (not shown) disposed or formed on at least one surface of the second electrode collector. In an exemplary embodiment, where the first electrode 111 is a positive electrode and the second electrode 112 is a negative electrode, the first electrode collector becomes a positive collector and the first electrode active material layer may be a positive active material layer. In such an embodiment, the second electrode collector may be a negative collector and the second electrode active material layer may be a negative active material layer.

The positive collector may include or formed of a metal, for example, aluminum, stainless steel, titan, copper, silver or a combination thereof. The positive active material layer may include a positive active material, a binder, and a conductive material. In an exemplary embodiment, where the secondary battery is a lithium secondary battery, the positive active material layer may include a material capable of reversibly occluding and discharging lithium ions.

In one exemplary embodiment, for example, the positive active material may include at least one material selected from lithium transition metal oxide, such as lithium cobalt oxide, lithium nickel oxide, lithium nickel cobaltate, lithium nickel cobalt aluminate, lithium nickel cobalt manganese oxide, lithium manganese oxide and lithium iron phosphate, nickel sulfide, copper sulfide, sulfur, iron oxide, and vanadium oxide.

In one exemplary embodiment, for example, the binder may include at least one material selected from a polyvinylidene fluoride-based binder such as polyvinylidene fluoride, vinylidene fluoride/hexafluoropropylene copolymer, vinylidene fluoride/tetrafluoroethylene copolymer, etc., a carboxymethyl cellulose-based binder such as sodium-carboxymethylcellulose, lithium carboxymethylcellulose cellulose, etc., an acrylate-based binder such as polyacrylate, lithium polyacrylate, acrylic, polyacrylonitrile, polymethyl methacrylate, polybutyl acrylate, etc., polyamide-imide, polytetrafluoroethylene, polyethylene oxide, polypyrrole, lithium-Nafion, and a styrene butadiene rubber-based polymer.

In one exemplary embodiment, for example, the conductive material may include at least one material selected from a carbon-based conductive material, such as carbon black, carbon fibers and graphite, conductive fibers such as metallic fibers, metallic powder such as carbon fluoride powder, aluminum powder and nickel powder, conductive whiskers such as zinc oxide and potassium titanate, conductive metal oxide such as titan oxide, and a conductive polymer such as polyphenylene derivatives.

In one exemplary embodiment, for example, the negative collector may include at least one selected from copper, stainless steel, nickel, aluminum, and titan. The negative active material layer may include a negative active material, a binder, and a conductive material. In an exemplary embodiment, where the secondary battery is a lithium secondary battery, the active material layer may include a material capable of alloying with lithium or reversibly occluding and discharging lithium ions.

In one exemplary embodiment, for example, the negative active material may include at least one material selected from a metal, a carbon-based material, a metal oxide, and a lithium metal nitride. The metal may include at least one material selected from lithium, silicon, magnesium, calcium, aluminum, germanium, tin, lead, arsenic, antimony, bismuth, silver, gold, zinc, cadmium, mercury, copper, iron, nickel, cobalt, and indium. The carbon-based material may include at least one material selected from graphite, graphitized carbon fiber, coke, mesocarbon microbeads ("MCMB"), polyacene, pitch-based carbon fiber, and hard carbon. The metal oxide may include at least one material selected from lithium titanium oxide, titanium oxide, molybdenum oxide, niobium oxide, iron oxide, tungsten oxide, tin oxide, amorphous tin oxide compound, silicon mono-oxide, cobalt oxide, and nickel oxide. Alternatively, the binder and the conductive material included in the positive active material layer may be respectively and identically used as the binder and conductive material included in the negative active material layer.

The separation films 113 are disposed between the first electrodes 111 and the second electrodes 112. The separation films 113 electrically separate the first electrodes 111 and the second electrodes 112. The separation films 113 may include, for example, a porous polymer film including polyethylene or polypropylene, woven fabrics or non-woven fabrics including polymer fibers, ceramic particles, or polymer solid electrolyte. However, the invention is not limited thereto.

The electrode tabs 121 and 122 may include a plurality of first electrode tabs 121 extending from the first electrodes 111 to the outside of the electrode assembly 110 and a plurality of second electrode tabs 122 extending from the second electrodes 112 to the outside of the electrode assembly 110. In an exemplary embodiment, as shown in FIG. 1, the first and second electrode tabs 121 and 122 may be arranged at opposite sides of the electrode assembly 110 in a width direction of the electrode assembly 110. The first electrode tabs 121 are electrically connected to the first electrodes 111, e.g., the first electrode collectors, and the second electrode tabs 122 are electrically connected to the second electrodes 112, e.g., the second electrode collectors. The first and second electrode tabs 121 and 122 may include, for example, a metal exhibiting a high conductivity, such as, Cu or Al, but the invention is not limited thereto.

Each of the first and second electrode tabs 121 and 122 may have, for example, a width W1 that is less than about 50% of the width W of the electrode assembly 110. In one exemplary embodiment, for example, each of the first and second electrode tabs 121 and 122 may have a relatively wide width W1 that is equal to or greater than about 25% and less than about 50% of the width W of the electrode assembly 110. In one alternative exemplary embodiment, for example, each of the first and second electrode tabs 121 and 122 may have a relatively narrow width W1 that is less than about 25% of the width W of the electrode assembly 110. However, the invention is not limited thereto, and the width of each of the first and second electrode tabs 121 and 122 may be variously modified.

The lead tabs 131 and 132 may include a first lead tab 131 connected to the first electrode tabs 121 and a second lead tab 132 connected to the second electrode tabs 122. The first and second lead tabs 131 and 132 may include, for example, a metal exhibiting a high conductivity, such as, Ni or Al, but the invention is not limited thereto.

Each of the first and second lead tabs 131 and 132 may have, for example, a width W2 that is equal to or less than about 25% of the width W of the lead assembly 110. In one exemplary embodiment, for example, each of the first and second lead tabs 131 and 132 may have a relatively wide width W2 that is greater than about 15% and equal to or less than about 25% of the width W of the lead assembly 110. In one alternative exemplary embodiment, for example, each of the first and second lead tabs 131 and 132 may have a relatively narrow width W1 that is equal to or less than about 15% of the width W of the lead assembly 110. However, the invention is not limited thereto, and the width of each of the first and second lead tabs 131 and 132 may be variously modified.

In an exemplary embodiment, a first tab connection portion 141 may be defined by portions of the first lead tab 131 and the first electrode tabs 121, where are connected to each other. In the first tab connection portion 141, a part, for example, one end, of the first lead tab 131 is folded, and the first electrode tabs 121 may be inserted into the folded part of the first lead tab 131. In the first tab connection portion 141, the first electrode tabs 121 are electrically connected to each other, and the first electrode tabs 121 and the first lead tab 131 are electrically connected to each other. In an exemplary embodiment, a second tab connection portion 142 may be defined by portions of the second lead tab 132, and the second electrode tabs 122, which connected to each other. In the second tab connection portion 142, a part, for example, one end, of the second lead tab 132 is folded, and the second electrode tabs 122 may be inserted into the folded part of the second lead tab 132. In the second tab connection portion 142, the second electrode tabs 122 are electrically connected to each other, and the second electrode tabs 122 and the second lead tab 132 are electrically connected to each other. The first and second tab connection portions 141 and 142 may be provided or formed by, for example, welding, pressing, or adhesion, but the invention is not limited thereto.

The first and second lead tabs 131 and 132 may contact the electrode assembly 110. In one exemplary embodiment, for example, each of the first and second lead tabs 131 and 132 may be in contact with one surface of the electrode assembly 110, that is, an upper surface of the electrode assembly 110 in FIGS. 1 to 4. In such an embodiment, the first and second lead tabs 131 and 132 contacting the electrode assembly 110 may be effectively fixed on a contact surface of the electrode assembly 110 by a fixing portion 160 of FIG. 14 that is described later.

An insulation layer 114 may be disposed or formed on a contact surface, for example, the upper surface, of the electrode assembly 110, and in contact with the first and second lead tabs 131 and 132. The insulation layer 114 provides insulation between the first and second lead tabs 131 and 132 and the first electrode 111, and may include at least one material selected from various insulation materials. In an exemplary embodiment, the insulation layer 114 may include a separation film material such as a porous polymer film. The insulation layer 114 may be disposed to cover or overlap an entire upper surface of the electrode assembly 110 or only on a contact surface, contacting the first and second lead tabs 131 and 132, of the upper surface of the electrode assembly 110.

In an exemplary embodiment, as described above, in the first tab connection portion 141, a part of the first lead tab 131 is folded and the first electrode tabs 121 are inserted into the folded part of the first lead tab 131. The first tab connection portion 141 may be disposed on the contact surface of the electrode assembly 110 which the first lead tab 131 is in contact with. In such an embodiment, the first lead tab 131 in the first tab connection portion 141 is in contact with the upper surface of the electrode assembly 110. In an exemplary embodiment, in the second tab connection portion 142, a part of the second lead tab 132 is folded and the second electrode tabs 122 are inserted into the folded part of the second lead tab 132. The second tab connection portion 142 may be provided on the contact surface of the electrode assembly 110 that the second lead tab 132 is in contact with. In such an embodiment, the second lead tab 132 in the second tab connection portion 142 is in contact with the upper surface of the electrode assembly 110.

Each of the first and second electrode tabs 121 and 122 may be provided to be folded. In an exemplary embodiment, the first electrode tabs 121 may be folded at least twice between the electrode assembly 110 and the first tab connection portion 141. In an exemplary embodiment the second electrode tabs 122 may be folded at least twice between the electrode assembly 110 and the second tab connection portion 142. FIG. 2 illustrates an exemplary embodiment, in which the first electrode tabs 121 include tri-folded parts 121a. FIG. 4 illustrates an exemplary embodiment in which the second electrode tabs 122 include tri-folded portions 122a. However, the invention is not limited thereto or thereby. In an alternative exemplary embodiment, the first and second electrode tabs 121 and 122 may be folded four or more times.

In an exemplary embodiment, as described above, the first and second lead tabs 131 and 132 are in contact with the upper surface of the electrode assembly 110, but not being limited thereto. In an alternative exemplary embodiment, the first and second lead tabs 131 and 132 may contact a lower surface of the electrode assembly 110. In such an embodiment, an insulation layer 114 provided for insulation between the first and second lead tabs 131 and 132 and the second electrode 112 may be disposed on the lower surface of the electrode assembly 110. FIGS. 2 and 4 illustrate exemplary embodiments in which the first and second electrode tabs 121 and 122 are folded in a direction parallel to the first and second electrodes 111 and 112, but the invention is not limited thereto. In an alternative exemplary embodiment, the first and second electrode tabs 121 and 122 may be folded in a direction perpendicular to the first and second electrodes 111 and 112, e.g., a thickness direction.

In such an embodiment of the cell structure 101 for a secondary battery, as described above, the first and second lead tabs 131 and 132 that are connected to the first and second electrode tabs 121 and 122 are in contact with one surface of the electrode assembly 110, and the first and second electrode tabs 121 and 122 are folded at least twice. Accordingly, the first and second lead tabs 131 and 132 contacting with the electrode assembly 110 may support or absorb stress generated due to bending deformation of the cell structure 101, and thus bending durability may be improved. In such an embodiment, since the folded parts of the first and second electrode tabs 121 and 122 may additionally support or absorb the stress, bending durability may be further improved.

Figure 5:
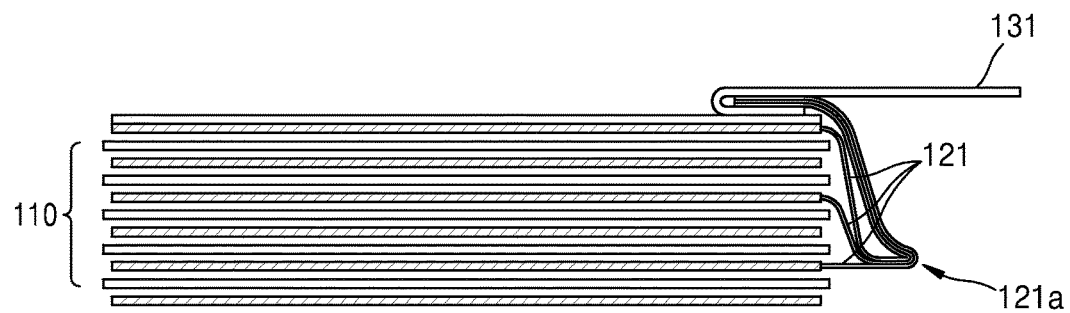
FIG. 5 illustrates an alternative exemplary embodiment of electrode tabs in the cell structure for a secondary battery illustrated in FIG. 1.
Figure 6:
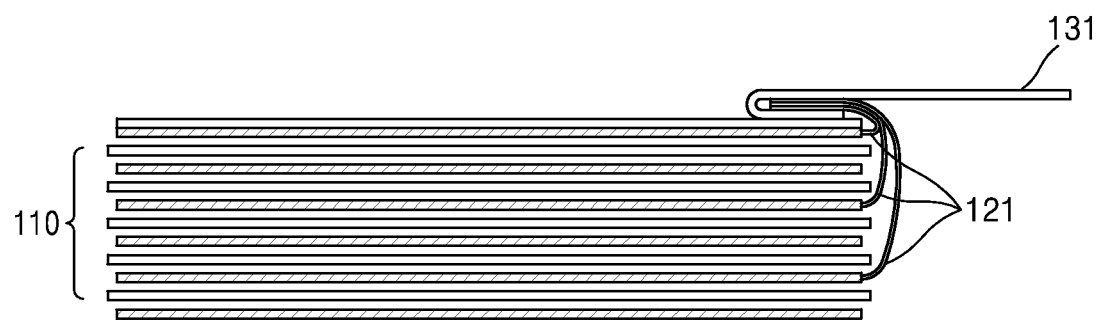
FIG. 6 illustrates another alternative exemplary embodiment of the electrode tabs in the cell structure for a secondary battery illustrated in FIG. 1.

FIG. 5 illustrates an alternative exemplary embodiment of the first electrode tabs 121 in the cell structure 101 for a secondary battery illustrated in FIG. 1. Referring to FIG. 5, in an exemplary embodiment, the first electrode tabs 121 include a single-folded part 121*a*. FIG. 6 illustrates another alternative exemplary embodiment of the first electrode tabs 121 in the cell structure 101 for a secondary battery illustrated in FIG. 1. Referring to FIG. 6, the first electrode tabs 121 may include no folded part unlike the above-described exemplary embodiments.

Figure 7:
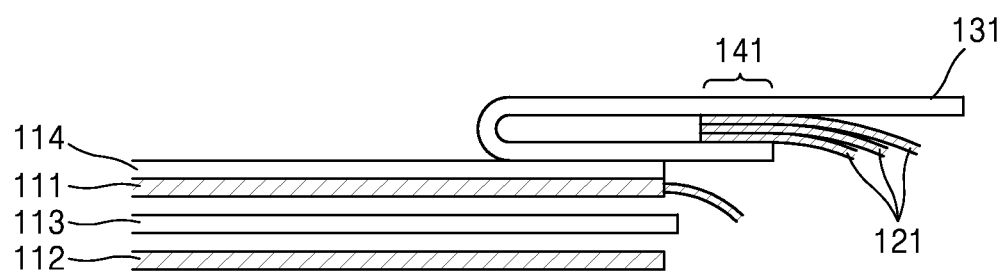
FIG. 7 illustrates an alternative exemplary embodiment of a tab connection portion in the cell structure for a secondary battery illustrated in FIG. 1.

FIG. 7 illustrates an alternative exemplary embodiment of the first tab connection portion 141 in the cell structure 101 for a secondary battery illustrated in FIG. 1. Referring to FIG. 7, in an exemplary embodiment, the first lead tab 131 may have a structure in which one end portion of the first lead tab 131 is folded, and may be in contact with the upper surface of the electrode assembly 110. In such an embodiment, the first electrode tabs 121 are inserted into the folded part of the first lead tab 131, thereby defining or forming the first tab connection portion 141. In an alternative exemplary embodiment, the first tab connection portion 141 may be spaced apart from the contact surface of the electrode assembly 110, which the first lead tab 131 is in contact with.

Figure 8:
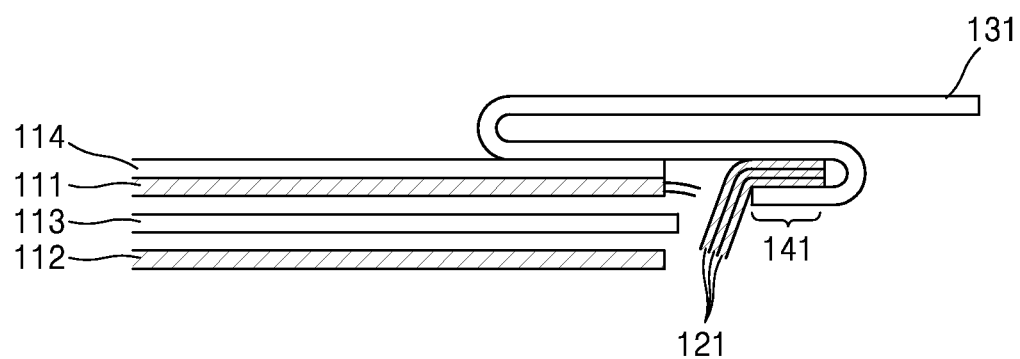
FIG. 8 illustrates another alternative exemplary embodiment of the tab connection portion in the cell structure for a secondary battery illustrated in FIG. 1.

FIG. 8 illustrates another alternative exemplary embodiment of the first tab connection portion 141 in the cell structure 101 for a secondary battery illustrated in FIG. 1. Referring to FIG. 8, the first lead tab 131 has a structure in which an end portion of the first lead tab 131 is folded twice. The first electrode tabs 121 are inserted into one of the folded parts of the first lead tab 131, thereby defining or forming the first tab connection portion 141. The other portion of the folded parts of the first lead tab 131 is in contact with the electrode assembly 110. The first tab connection portion 141 where the first lead tab 131 and the first electrode tabs 121 are connected to each other may be spaced apart from the contact surface of the electrode assembly 110, which the first lead tab 131 is in contact with.

Figure 9:
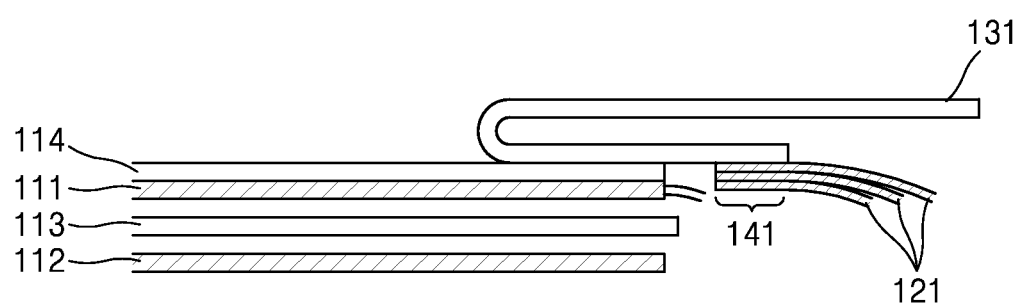
FIG. 9 illustrates another alternative exemplary embodiment of the tab connection portion in the cell structure for a secondary battery illustrated in FIG. 1.

FIG. 9 illustrates another alternative exemplary embodiment of the first tab connection portion 141 in the cell structure 101 for a secondary battery illustrated in FIG. 1. Referring to FIG. 9, in an exemplary embodiment, the first lead tab 131 has a structure in which an end portion of the first lead tab 131 is folded. The folded part of the first lead tab 131 is in contact with the upper surface of the electrode assembly 110. In such an embodiment, the first electrode tabs 121 are in contact with a surface (e.g., an outer surface of the folded end portion) of the first lead tab 131, thereby defining or forming the first tab connection portion 141. The first tab connection portion 141 where the first lead tab 131 and the first electrode tabs 121 are connected to each other may be spaced apart from the contact surface of the electrode assembly 110, which the first lead tab 131 is in contact with.

Figure 10:
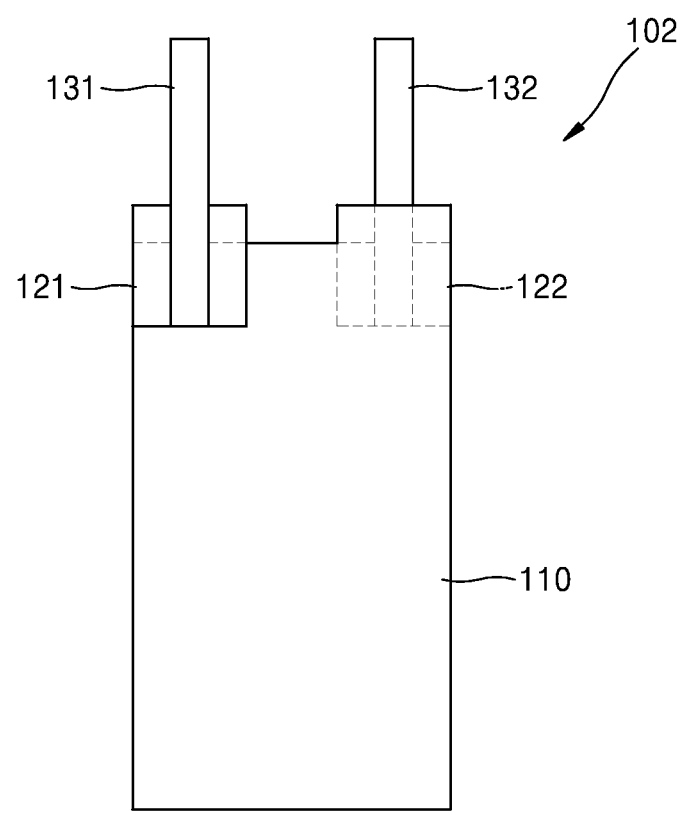
FIG. 10 is a plan view of a cell structure for a secondary battery according to another exemplary embodiment of the invention.

FIG. 10 is a plan view of a cell structure 102 for a secondary battery according to another exemplary embodiment of the invention. Referring to FIG. 10, in an exemplary embodiment, the first and second electrode tabs 121 and 122 may be arranged at opposite sides of the electrode assembly 110 in a width direction of the electrode assembly 110. In an exemplary embodiment, the first lead tab 131 and the second lead tab 132 may be in contact with opposing surface of the electrode assembly 110. In an embodiment, as shown in FIG. 10, the first lead tab 131 connected to the first electrode tabs 121 is in contact with the upper surface of the electrode assembly 110, and the second lead tab 132 connected to the second electrode tabs 122 is in contact with the lower surface of the electrode assembly 110. In such an embodiment, the insulation layer 114 of FIG. 2 may be disposed on the upper and lower surfaces of the electrode assembly 110. Alternatively, the first lead tab 131 may be in contact with the lower surface of the electrode assembly 110, and the second lead tab 132 may be in contact with the upper surface of the electrode assembly 110.

Figure 11:
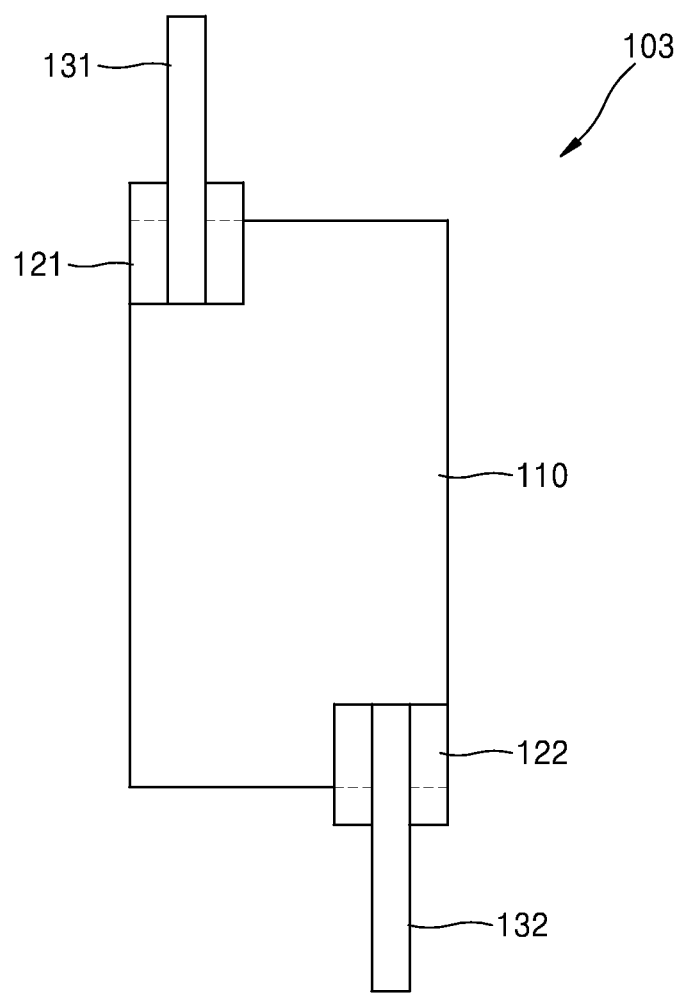
FIG. 11 is a plan view of a cell structure for a secondary battery according to another exemplary embodiment of the invention.

FIG. 11 is a plan view of a cell structure 103 for a secondary battery according to another exemplary embodiment of the invention. Referring to FIG. 11, in an exemplary embodiment of the cell structure 103, the first and second electrode tabs 121 and 122 may be arranged at opposite sides of the electrode assembly 110 in a length direction of the electrode assembly 110. In such an embodiment, the first lead tab 131 connected to the first electrode tabs 121 and the second lead tab 132 connected to the second electrode tabs 122 are in contact with the upper surface of the electrode assembly 110. Alternatively, the first and second lead tabs 131 and 132 may be in contact with the lower surface of the electrode assembly 110. In another alternative exemplary embodiment, any one of the first and second lead tabs 131 and 132 may be in contact with the upper surface of the electrode assembly 110, and the other one thereof may be in contact with the lower surface of the electrode assembly 110.

Figure 12:
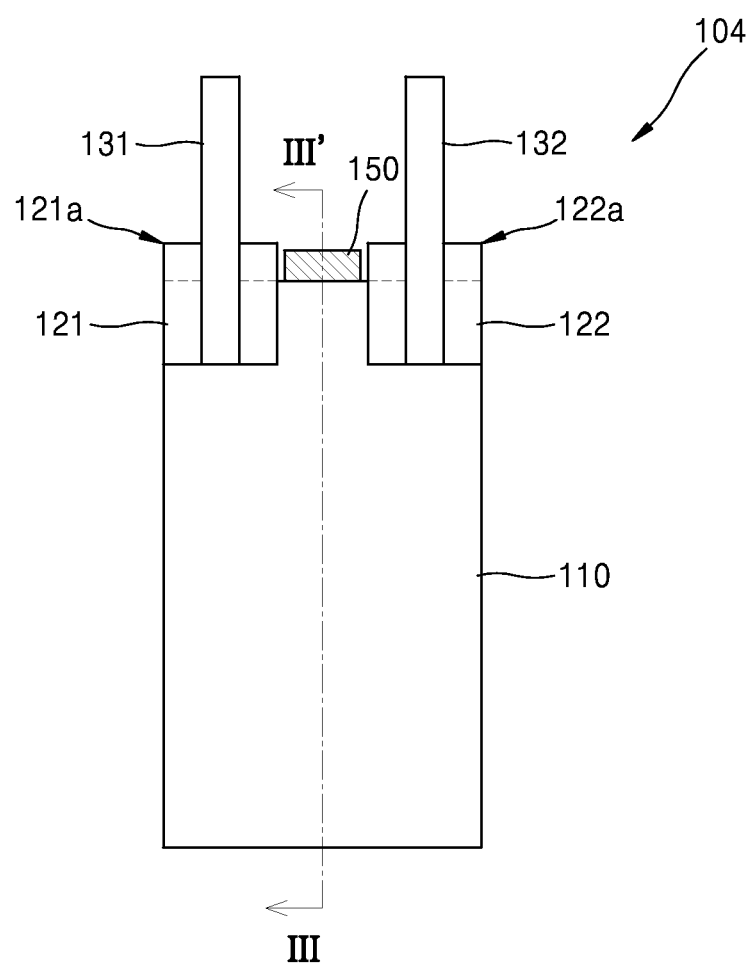
FIG. 12 is a plan view of a cell structure for a secondary battery according to another exemplary embodiment of the invention.
Figure 13:
FIG. 13 is a cross-sectional view taken along line III-III' of FIG. 12.

FIG. 12 is a plan view of a cell structure 104 for a secondary battery according to another exemplary embodiment of the invention. FIG. 13 is a cross-sectional view taken along line III-III' of FIG. 12.

Referring to FIGS. 12 and 13, the cell structure 104 according to an exemplary embodiment of the invention may include the electrode assembly 110, the first and second electrode tabs 121 and 122 extending to the outside of the electrode assembly 110, the first and second lead tabs 131 and 132 connected to the first and second electrode tabs 121 and 122, respectively, and a binding member 150 that fixes one end portion of the electrode assembly 110. In such an embodiment, the electrode assembly 110, the first and second electrode tabs 121 and 122, and the first and second lead tabs 131 and 132 are substantially the same as those in the exemplary embodiments described above, and any repetitive detailed description thereof will be omitted.

In such an embodiment, the binding member 150 may fix an end portion of the electrode assembly 110. A portion of the electrode assembly 110 may protrude between the first and second electrode tabs 121 and 122. The protruding portion of the electrode assembly 110 may be fixed by the binding member 150. In an exemplary embodiment, as shown in FIGS. 12 and 13, the first electrode 111, the second electrode 112 and the separation films 113 are fixed by the binding member 150, but the invention is not limited thereto. In alternative exemplary embodiment, at least one of the first electrode 111, the second electrode 112 and the separation films 113 may be fixed by the binding member 150.

When the electrode assembly 110 is not fixed, relative positions between individual layers defining the electrode assembly 110 are changed during repetitive bending motions of the electrode assembly 110 such that alignment therebetween may be lost, and thus stability may be deteriorated. In an exemplary embodiment, where a part of the electrode assembly 110 is fixed by the binding member 150, even when the electrode assembly 110 repeatedly performs bending deformation, misalignment between individual layers of the electrode assembly 110 may be substantially reduced. In an exemplary embodiment, as described above, one end portion of the electrode assembly 110 is fixed by the binding member 150, but the invention is not limited thereto. In one alternative exemplary embodiment, for example, opposing end portions of the electrode assembly 110, or a center portion of the electrode assembly 110, may be fixed by the binding member 150.

Figure 14:
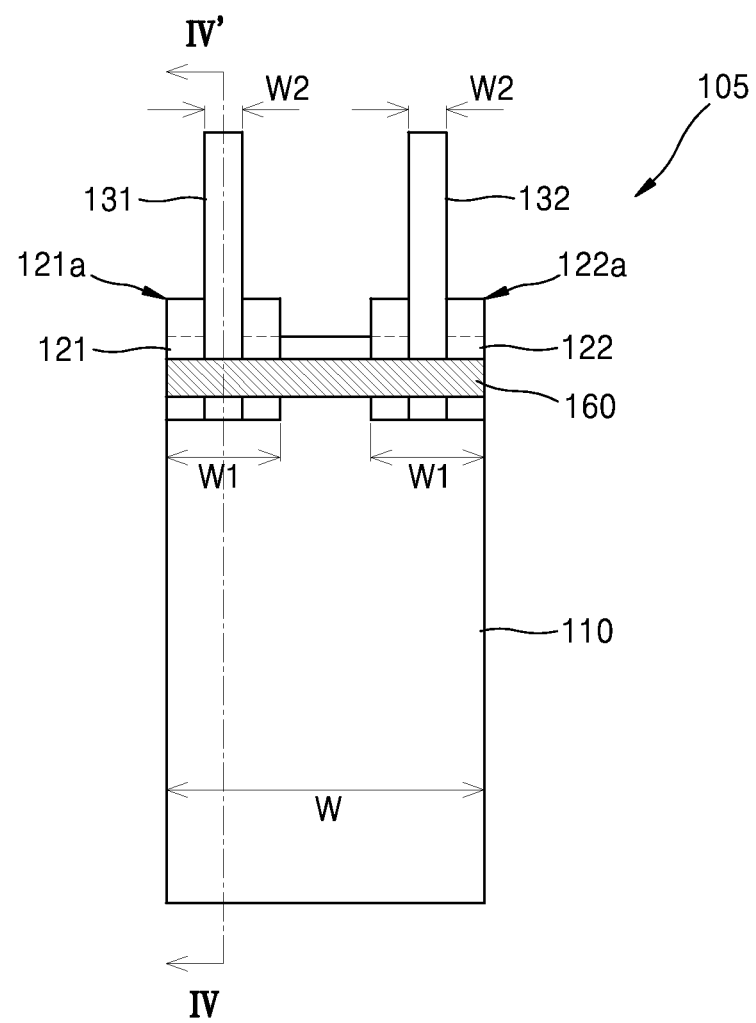
FIG. 14 is a plan view of a cell structure for a secondary battery according to another exemplary embodiment of the invention.
Figure 15:
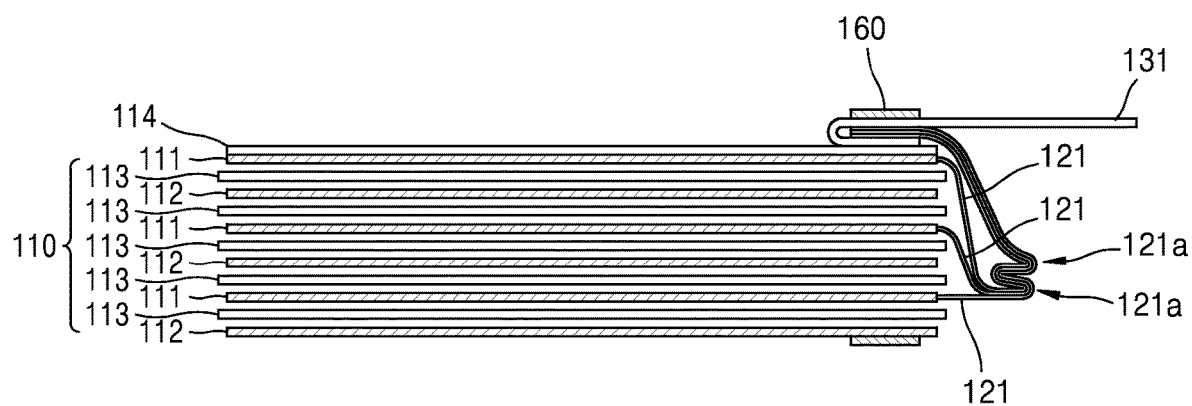
FIG. 15 is a cross-sectional view taken along line IV-IV' of FIG. 14.

FIG. 14 is a plan view of a cell structure 105 for a secondary battery according to another exemplary embodiment of the invention. FIG. 15 is a cross-sectional view taken along line IV-IV' of FIG. 14.

Referring to FIGS. 14 and 15, an exemplary embodiment of the cell structure 105 may include the electrode assembly 110, the first and second electrode tabs 121 and 122 extending to the outside of the electrode assembly 110, the first and second lead tabs 131 and 132 respectively connected to the first and second electrode tabs 121 and 122, and a fixing unit 160 that fixes the first and second lead tabs 131 and 132 to the electrode assembly 110.

The electrode assembly 110 may include a plurality of first electrodes 111 and plurality of second electrodes 112, which are alternately stacked one on another, and a plurality of separation films 113 disposed between the first electrodes 111 and the second electrodes 112. Any one of the first electrode 111 and the second electrode 112 may be a positive electrode and the other one thereof may be a negative electrode. The first and second electrodes 111 and 112 and the separation films 113 of the electrode assembly 110 may include a flexible material that allows bending deformation of the electrode assembly 110. However, the invention is not limited thereto.

The first and second electrode tabs 121 and 122 may be arranged at opposite sides of the electrode assembly 110 in a width direction of the electrode assembly 110. The first electrode tabs 121 are electrically connected to the first electrodes 111 and the second electrode tabs 122 are electrically connected to the second electrodes 112. Alternatively, the first and second electrode tabs 121 and 122 may be arranged at opposite sides of the electrode assembly 110 in a length direction of the electrode assembly 110. Each of the first and second electrode tabs 121 and 122 may have, for example, the width W1 that is less than about 50% of the width W of the electrode assembly 110.

The first lead tab 131 is electrically connected to the first electrode tabs 121, and the second lead tab 132 is electrically connected to the second electrode tabs 122. Each of the first and second lead tabs 131 and 132 may have, for example, the width W2 that is equal to or less than about 25% of the width W of the electrode assembly 110.

In such an embodiment, the first tab connection portion may be defined by portions of the first lead tab 131 and the first electrode tabs 121, which are connected to each other. In the first tab connection portion, one end portion of the first lead tab 131 is folded. The first electrode tabs 121 may be inserted into the folded part of the first lead tab 131. In an exemplary embodiment, the second tab connection portion 142 may be defined by portions of the second lead tab 132 and the second electrode tabs 122, which are connected to each other. In the second tab connection portion, one end portion of the second lead tab 132 is folded. The second electrode tabs 122 may be inserted into the folded part of the second lead tab 132.

The first and second lead tabs 131 and 132 may be in contact with the electrode assembly 110. In one exemplary embodiment, for example, each of the first and second lead tabs 131 and 132 is in contact with the upper surface of the electrode assembly 110. An insulation layer may be disposed on the contact surface of the electrode assembly 110, which the first and second lead tabs 131 and 132 contact. In an alternative exemplary embodiment, the first and second lead tabs 131 and 132 may be in contact with the lower surface of the electrode assembly 110. In another alternative exemplary embodiment, any one of the first and second lead tabs 131 and 132 may be in contact with the upper surface of the electrode assembly 110, and the other one thereof may be in contact with the lower surface of the electrode assembly 110.

The first tab connection portion 141 may be disposed on the contact surface of the electrode assembly 110, which the first lead tab 131 contacts, and the second tab connection portion 142 may be disposed on the contact surface of the electrode assembly 110, which the second lead tab 132 contacts. Alternatively, the first and second tab connection portions may be spaced apart from the contact surface of the electrode assembly 110.

The fixing unit 160 may fix the first and second lead tabs 131 and 132 contacting the electrode assembly 110 to the electrode assembly 110. The fixing unit 160 may fix a portion of the first and second lead tabs 131 and 132, which contacts the electrode assembly 110, to the electrode assembly 110. The fixing unit 160 may include, for example, a tape or an adhesive, but not being limited thereto. In an alternative exemplary embodiment, the fixing unit 160 may include at least one of a variety of materials that enables the first and second lead tabs 131 and 132 to be fixed to the electrode assembly 110. The fixing unit 160 may fix the first and second lead tabs 131 and 132 to the electrode assembly 110 while maintaining a contact state with the electrode assembly 110.

Each of the first and second electrode tabs 121 and 122 may be folded. FIG. 15 illustrates an exemplary embodiment in which each of the first and second electrode tabs 121 and 122 includes tri-folded parts 121*a* and 122*a*. However, the invention is not limited thereto. In an alternative exemplary embodiment, each of the first and second electrode tabs 121 and 122 may be folded once, twice, or four or more times.

In another alternative exemplary embodiment, the first and second electrode tabs 121 and 122 may have a flat shape without being folded.

In an exemplary embodiment of the cell structure 105 according to the invention, since the first and second lead tabs 131 and 132 are fixed by the fixing unit 160 and maintain a contact state with the electrode assembly 110, the first and second lead tabs 131 and 132 may effectively support or absorb the stress generated due to bending of the cell structure 105.

Figure 16:
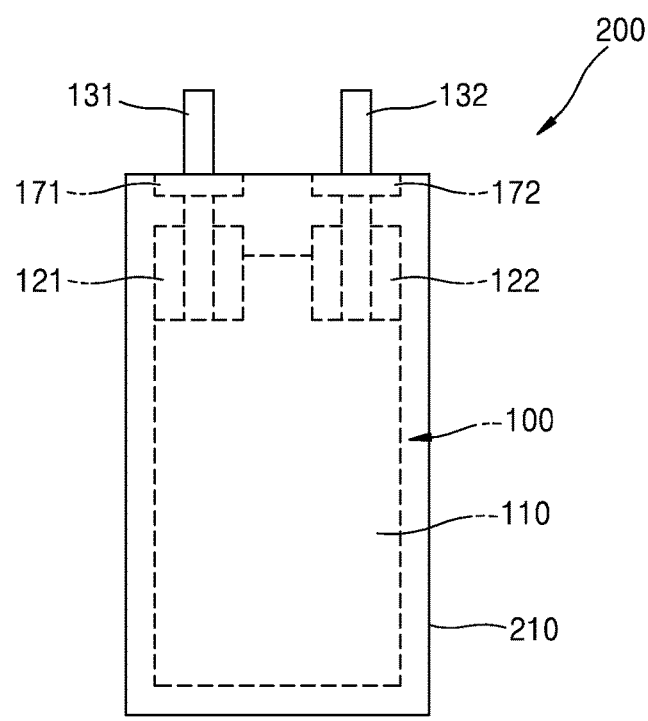
FIG. 16 is a plan view of a secondary battery according to another exemplary embodiment of the invention.

FIG. 16 is a plan view of a secondary battery 200 according to another exemplary embodiment of the invention.

Referring to FIG. 16, an exemplary embodiment of the secondary battery 200 may include an exterior member 210 and a cell structure 100 that is packaged by the exterior member 210. The cell structure 100 may include an exemplary embodiment of the cell structure 101, 102, 103, 104 or 105 described above. The cell structure 100 is packaged and sealed by the exterior member 210, and the inside of the exterior member 210 may be filled with an electrolyte. The first and second lead tabs 131 and 132 of the cell structure 100 may be partially exposed outside the exterior member 210. Meanwhile, when the cell structure 100 is packaged with the exterior member 210, sealing members 171 and 172 may be further disposed on the first and second lead tabs 131 and 132 to effectively or completely seal the first and second lead tabs 131 and 132 and a periphery thereof.

Hereinafter, the cell structures for a secondary battery according to the exemplary embodiments and cell structures for a secondary battery according to comparative embodiments will be described in detail. FIGS. 17A to 17D illustrate cell structures 301, 302, 303, and 304 for a secondary battery according to exemplary embodiments of the invention. FIGS. 17E and 17F illustrate cell structures 401 and 402 for a secondary battery according to comparative embodiments. In the cell structures 301, 302, 303, 304, 401 and 402 for a secondary battery illustrated in FIGS. 17A to 17F, the electrode assembly 110 includes four first electrodes and four second electrodes, which are alternately stacked one on another. In FIGS. 17A to 17F, when the cell structures 301, 302, 303, 304, 401 and 402 are packaged with the exterior member 210 of FIG. 16, sealing members 171 and 172 seal the peripheries of the first and second lead tabs 131 and 132.

The cell structures 301, 302, 303 and 304 for a secondary battery according to the exemplary embodiments illustrated in FIGS. 17A to 17D have substantially the same structure as the cell structure 105 for a secondary battery illustrated in FIG. 14.

Figure 17A:
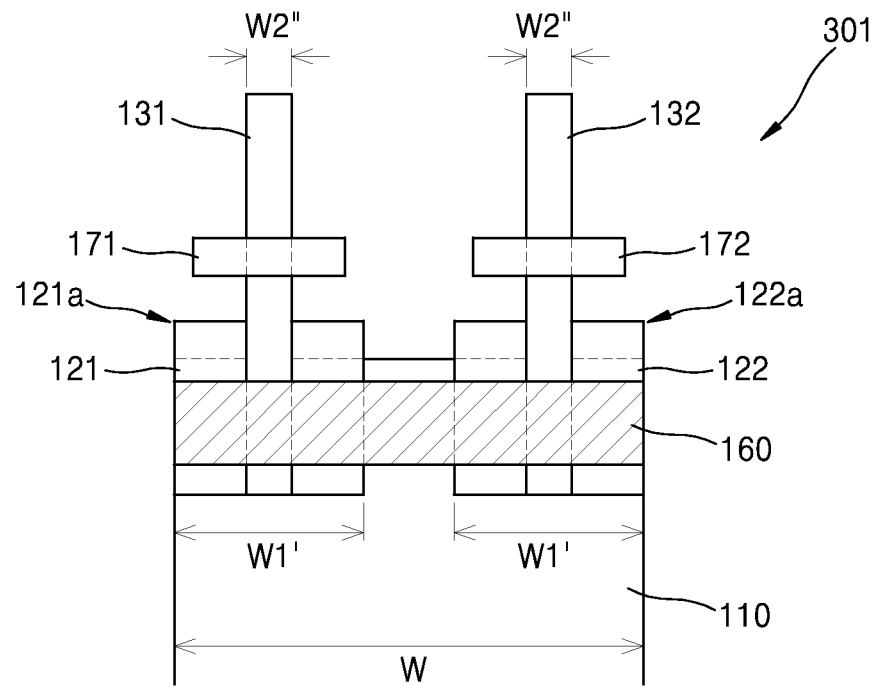
FIG. 17A is a plan view of a cell structure for a secondary battery according to an exemplary embodiment of the invention.

FIG. 17A is a plan view of the cell structure 301 for a secondary battery according to an exemplary embodiment (hereinafter, will be referred to as a first exemplary embodiment). Referring to FIG. 17A, in the first exemplary embodiment, the first and second electrode tabs 121 and 122 include tri-folded parts 121a and tri-folded parts 122a, respectively, and the first and second lead tabs 131 and 132 respectively connected to the first and second electrode tabs 121 and 122 are in contact with the upper surface of the electrode assembly 110 and fixed by the fixing unit 160. Each of the first and second electrode tabs 121 and 122 may have a wide width W1' that is equal to or greater than about 25% and less than about 50% of the width W of the electrode assembly 110. Each of the first and second lead tabs 131 and 132 has a narrow width W2" that is equal to or less than about 15% of the width W of the electrode assembly 110.

Figure 17B:
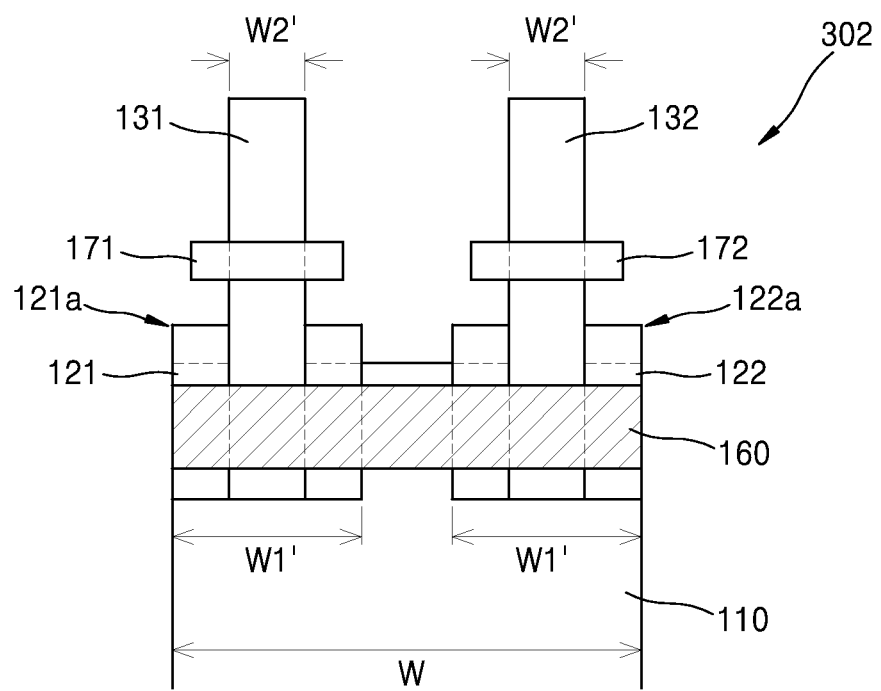
FIG. 17B is a plan view of a cell structure for a secondary battery according to another exemplary embodiment of the invention.

FIG. 17B is a plan view of the cell structure 302 for a secondary battery according to another exemplary embodiment (hereinafter, will be referred to as a second exemplary embodiment). Referring to FIG. 17B, in the second exemplary embodiment, the first and second electrode tabs 121 and 122 include tri-folded parts 121a and tri-folded parts 122a, respectively, and the first and second lead tabs 131 and 132 respectively connected to the first and second electrode tabs 121 and 122 are in contact with the upper surface of the electrode assembly 110 and fixed by the fixing unit 160. Each of the first and second electrode tabs 121 and 122 may have a wide width W1' that is equal to or greater than about 25% and less than about 50% of the width W of the electrode assembly 110. Each of the first and second lead tabs 131 and 132 has a wide width W2' that is greater than about 15% and equal to or less than about 25% of the width W of the electrode assembly 110.

Figure 17C:
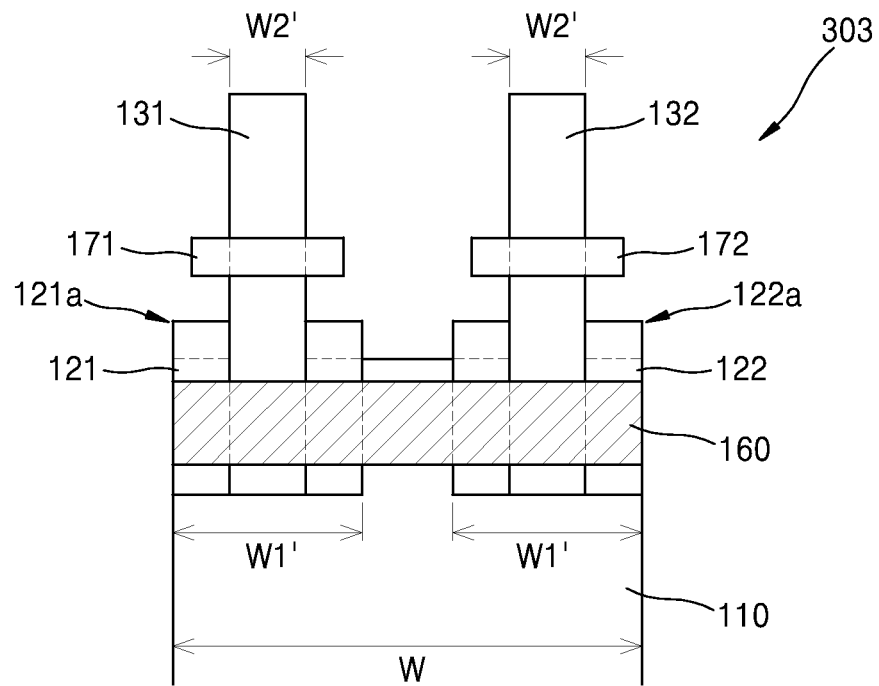
FIG. 17C is a plan view of a cell structure for a secondary battery according to another exemplary embodiment of the invention.

FIG. 17C is a plan view of the cell structure 303 for a secondary battery according to another exemplary embodiment (hereinafter, will be referred to as a third exemplary embodiment). Referring to FIG. 17C, in the third exemplary embodiment, the first and second electrode tabs 121 and 122 include one folded part 121a and one folded part 122a, respectively, and the first and second lead tabs 131 and 132 respectively connected to the first and second electrode tabs 121 and 122 are in contact with the upper surface of the electrode assembly 110 and fixed by the fixing unit 160. Each of the first and second electrode tabs 121 and 122 may have a wide width W1' that is equal to or greater than about 25% and less than about 50% of the width W of the electrode assembly 110. Each of the first and second lead tabs 131 and 132 has a wide width W2' that is greater than about 15% and equal to or less than about 25% of the width W of the electrode assembly 110.

Figure 17D:
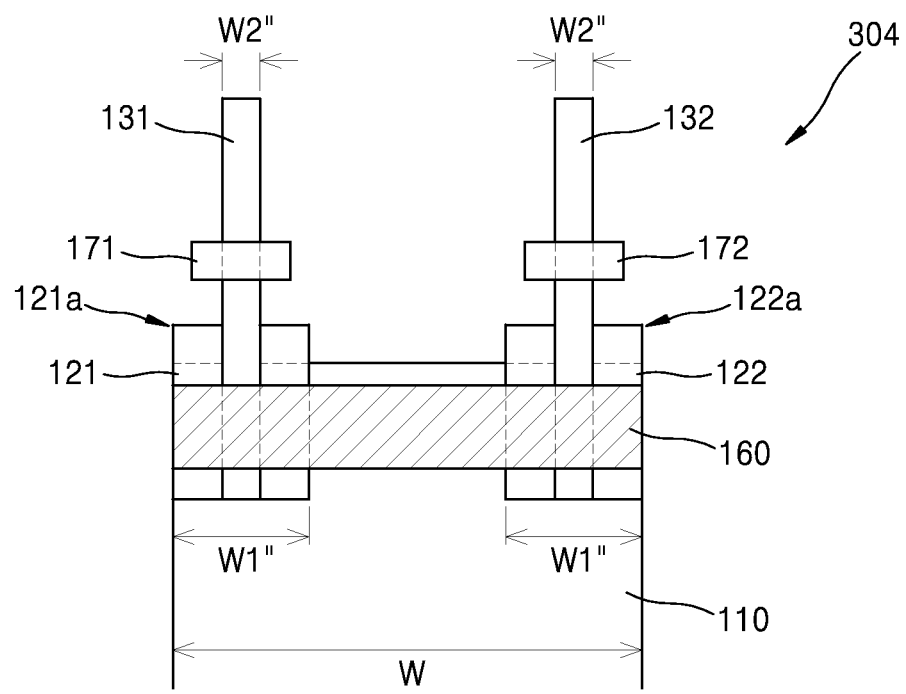
FIG. 17D is a plan view of a cell structure for a secondary battery according to another exemplary embodiment of the invention.
Figure 17E:
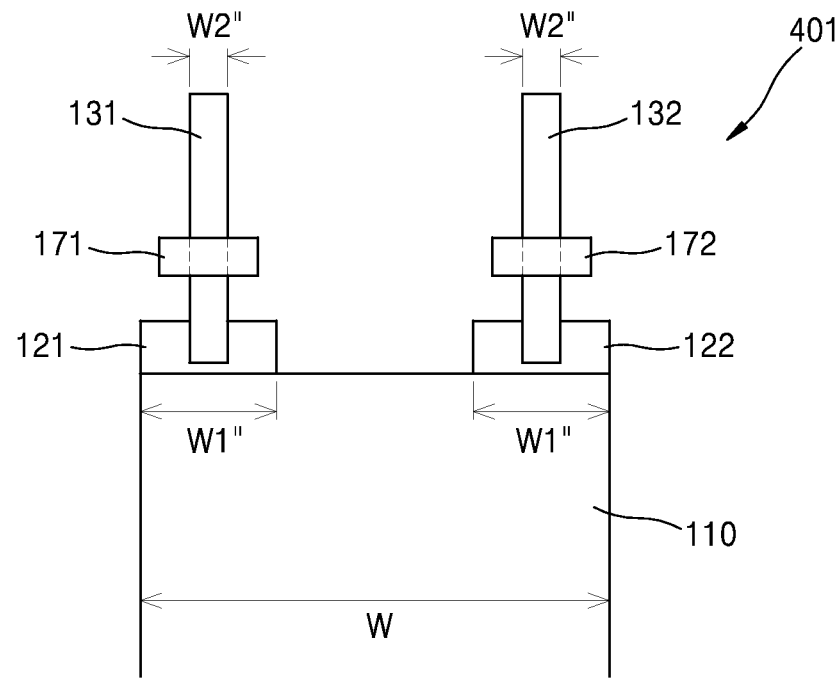
FIG. 17E is a plan view of a cell structure for a secondary battery according to a comparative embodiment.
Figure 17F:
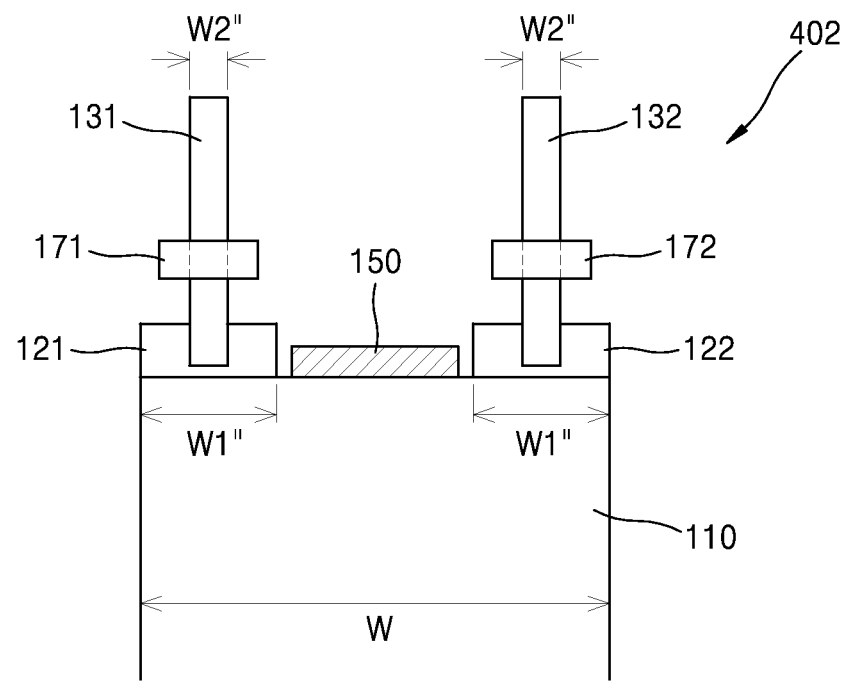
FIG. 17F is a plan view of a cell structure for a secondary battery according to another comparative embodiment.

FIG. 17D is a plan view of the cell structure 304 for a secondary battery according to another exemplary embodiment (hereinafter, will be referred to as a fourth exemplary embodiment). Referring to FIG. 17D, in the fourth exemplary embodiment, the first and second electrode tabs 121 and 122 include tri-folded parts 121a and tri-folded parts 122a, respectively, and the first and second lead tabs 131 and 132 respectively connected to the first and second electrode tabs 121 and 122 are in contact with the upper surface of the electrode assembly 110 and fixed by the fixing unit 160. Each of the first and second electrode tabs 121 and 122 may have a narrow width W1" that is less than about 25% of the width W of the lead assembly 110. Each of the first and second lead tabs 131 and 132 has a narrow width W2" that is equal to or less than about 15% of the width W of the electrode assembly 110.

FIG. 17E is a plan view of the cell structure 401 for a secondary battery according to a comparative embodiment (hereinafter, will be referred to as a first comparative embodiment). Referring to FIG. 17E, in the first comparative embodiment, the first and second electrode tabs 121 and 122 include tri-folded parts 121a and tri-folded parts 122a, respectively, and the first and second lead tabs 131 and 132 respectively connected to the first and second electrode tabs 121 and 122 are not in contact with the electrode assembly 110 and are not fixed by the fixing unit 160. Each of the first and second electrode tabs 121 and 122 may have a narrow width W1" that is less than about 25% of the width W of the electrode assembly 110. Each of the first and second lead tabs 131 and 132 has a narrow width W2" that is equal to or less than about 15% of the width W of the electrode assembly 110.

FIG. 17F is a plan view of the cell structure 402 for a secondary battery according to another comparative embodiment (hereinafter, will be referred to as a second comparative embodiment). Referring to FIG. 17F, in the second comparative embodiment, the first and second electrode tabs 121 and 122 include tri-folded parts 121a and tri-folded parts 122a, respectively, and the first and second lead tabs 131 and 132 respectively connected to the first and second electrode tabs 121 and 122 are not in contact with the electrode assembly 110 and are not fixed by the fixing unit 160. In the second comparative embodiment, one end portion of the electrode assembly 110 is fixed by the binding member 150. Each of the first and second electrode tabs 121 and 122 may have a narrow width W1" that is less than about 25% of the width W of the electrode assembly 110. Each of the first and second lead tabs 131 and 132 has a narrow width W2" that is equal to or less than about 15% of the width W of the electrode assembly 110.

Table 1 below shows charge/discharge properties before bending of secondary batteries including the embodiments of the cell structure 301, 302, 303, 304, 401 and 402 illustrated in FIGS. 17A to 17F, respectively. A solution of 1.15M LiPF6 in EC/EMC/DEC (3:5:2)+0.2% LiBF4+5.0% FEC+0.5% VEC+3.0% SN is used as an electrolyte. 0.1 C (1 cycle), 0.2 C (1 cycle), and 0.5 C (6 cycles) are used as conditions for measuring charge/discharge properties.

TABLE 1

|  | Initial Efficiency (%) | Coulombic Efficiency (%) | Capacity (mAh) | Energy Density (Wh/L) |
| --- | --- | --- | --- | --- |
| $1^{st}$ exemplary embodiment | 87.7 | 99.7 | 450 | 330 |
| $2^{nd}$ exemplary embodiment | 88.6 | 99.6 | 449 | 313 |
| $3^{rd}$ exemplary embodiment | 87.8 | 99.7 | 450 | 314 |
| $4^{th}$ exemplary embodiment | 88.3 | 99.7 | 452 | 331 |
| $1^{st}$ comparative embodiment | 88.4 | 99.6 | 449 | 330 |
| $2^{nd}$ comparative embodiment | 88.0 | 99.8 | 450 | 330 |

Referring to Table 1, the secondary batteries including the cell structures 301, 302, 303 and 304 according to the first to fourth exemplary embodiments, respectively, have initial efficiency, Coulombic efficiency, capacity, and energy density that are similar to those of the secondary batteries including the cell structures 401 and 402 according to the first and second comparative embodiment, respectively. Accordingly, the secondary batteries including the cell structures 301, 302, 303 and 304 according to the first to fourth exemplary embodiments, respectively, have normal charge/discharge properties like the secondary batteries including the cell structures 401 and 402 according to the first and second comparative embodiments.

Figure 18:
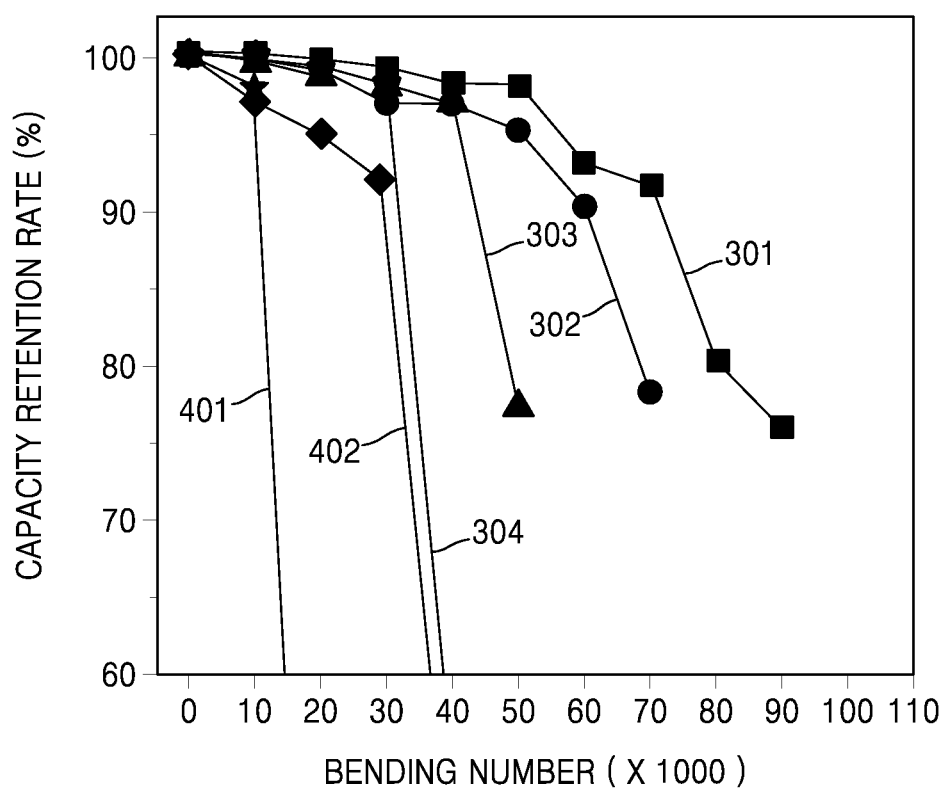
FIG. 18 is a graph showing a relationship between a capacity retention rate and a bending number with respect to secondary batteries including the cell structures illustrated in FIGS. 17A to 17F.
Figure 19:
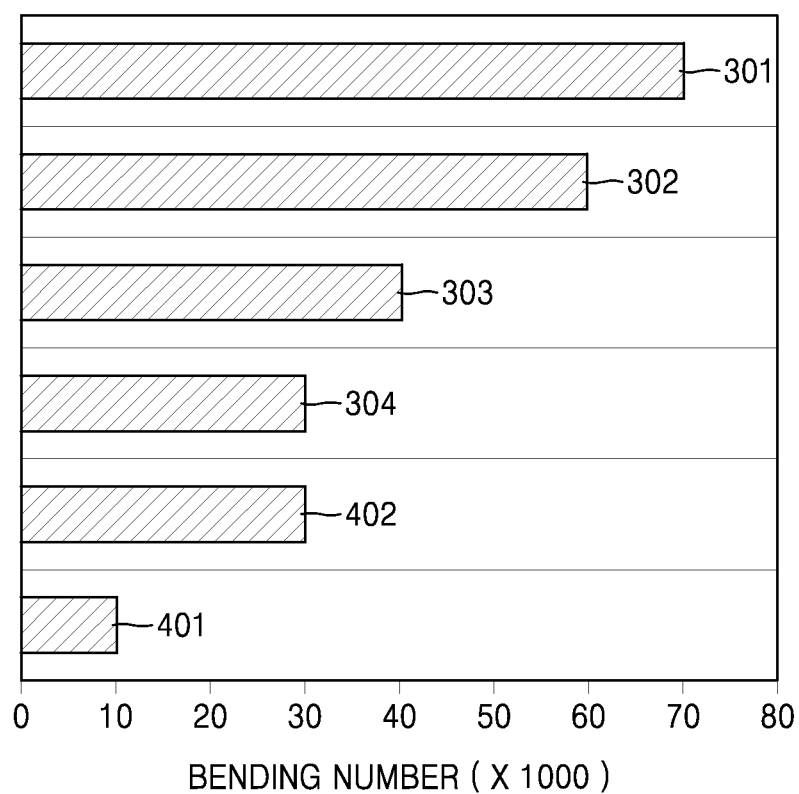
FIG. 19 is a graph showing bending numbers having a capacity retention rate of about 90% or high, with respect to secondary batteries including the cell structures illustrated in FIGS. 17A to 17F.

FIG. 18 is a graph showing a relationship between a capacity retention rate and a bending number with respect to the secondary batteries respectively including the cell structures 301, 302, 303, 304, 401 and 402 illustrated in FIGS. 17A to 17F. FIG. 19 is a graph showing bending numbers having a capacity retention rate of about 90% or high, with respect to the secondary batteries respectively including the cell structures 301, 302, 303, 304, 401 and 402 illustrated in FIGS. 17A to 17F. In FIGS. 18 and 19, the capacity retention rate signifies a rate of capacity according to a bending number with respect to an initial capacity. A solution of 1.15M LiPF6 in EC/EMC/DEC (3:5:2)+0.2% LiBF4+5.0% FEC+0.5% VEC+3.0% SN is used as an electrolyte. 0.5 C (2 cycles) is used as a condition for measuring charge/discharge properties. Bending durability is evaluated by a pressure-type bending evaluation method.

Referring to FIGS. 18 and 19, the secondary batteries including the cell structures 301, 302, 303 and 304 according to the first to fourth exemplary embodiments, respectively, have bending durability greater than that of the secondary battery including the cell structure 401 according to the first comparative embodiment. Accordingly, when the first and second lead tabs 131 and 132 are in contact with the electrode assembly 110 and fixed by the fixing unit 160, bending durability may be improved. Also, the secondary battery including the cell structure 304 according to the fourth exemplary embodiment has bending durability similar to that of the secondary battery including the cell structure 402 according to the second comparative embodiment. However, since the cell structure 402 according to the second comparative embodiment additionally includes the binding member 150 to bind a part of the electrode assembly 110, an additional process may be used in a manufacturing process of the cell structure 402. The cell structure 304 according to the fourth exemplary embodiment does not include the binding member, such that a manufacturing process of the cell structure 304 may be simplified compared to the cell structure 402 according to the second comparative embodiment.

When the secondary battery including the cell structure 302 according to the second exemplary embodiment and the secondary battery including the cell structure 303 according to the third exemplary embodiment are compared with each other, it may be seen that bending durability is superior in the structure in which each of the first and second electrode tabs 121 and 122 has a structure of being folded twice or more, than in the structure in which each of the first and second electrode tabs 121 and 122 has a structure of being folded once. When the secondary battery including the cell structure 301 according to the first exemplary embodiment and the secondary battery including the cell structure 302 according to the second exemplary embodiment are compared with each other, it may be seen that the secondary battery including the cell structure 301 according to the first exemplary embodiment, in which the first and second electrode tabs 121 and 122 have a relatively wide width and the first and second lead tabs 131 and 132 have a relatively narrow width, has a superior bending durability.

As described above, in an exemplary embodiment, where the first and second lead tabs 131 and 132 are in contact with the electrode assembly 110 and fixed by the fixing unit 160, the first and second lead tabs 131 and 132 contacting the electrode assembly 110 may support or absorb stress generated when the secondary battery is bending-deformed. Accordingly, in such an embodiment, bending durability of the secondary battery may be improved. In such an embodiment, as the first and second electrode tabs 121 and 122 are folded one or more times, the stress may be additionally supported or absorbed and thus bending durability of the secondary battery may be further improved.

According to the exemplary embodiments set forth herein, the lead tab connected to the electrode tabs is in contact with the electrode assembly, and the electrode tabs are folded a plurality of times. Accordingly, in such an embodiment, the lead tab contacting the electrode assembly may support or absorb stress generated when the cell structure is bending-deformed and thus bending durability of the secondary battery may be improved. In such an embodiment, the folded parts of the electrode tabs additionally support or absorb stress, such that bending durability of the secondary battery may be further improved.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A cell structure for a secondary battery, the cell structure comprising:
    an electrode assembly comprising a plurality of electrodes;
    a plurality of electrode tabs extending from the electrodes to an outside of the electrode assembly; and
    a plurality of lead tabs electrically connected to the electrode tabs and contacting the electrode assembly,
    wherein a part of each of the lead tabs is folded, and
    wherein the electrode assembly and the folded part of each of the lead tabs overlap each other when viewed from a plan view in a thickness direction of the electrode assembly.

2. The cell structure for a secondary battery of claim 1, further comprising:
    a fixing unit which fixes the lead tabs to a contact surface of the electrode assembly contacting the lead tabs.

3. The cell structure for a secondary battery of claim 1, wherein
    the electrode tabs are inserted into the folded part of each of the lead tabs.

4. The cell structure for a secondary battery of claim 1, wherein each of the electrode tabs is folded at least once.

5. The cell structure for a secondary battery of claim 1, wherein the electrode assembly comprises a flexible material.

6. The cell structure for a secondary battery of claim 1, further comprising:
    an insulation layer disposed on a contact surface of the electrode assembly contacting the lead tabs.

7. The cell structure for a secondary battery of claim 1, wherein
    each of the electrode tabs has a width less than about 50% of a width of the electrode assembly, and
    each of the lead tabs has a width equal to or less than about 25% of the width of the electrode assembly.

8. The cell structure for a secondary battery of claim 1, wherein
    the electrodes comprise a first electrode and a second electrode, which are alternately stacked one on another, and
    the electrode assembly further comprises a separation film disposed between the first electrode and the second electrode.

9. The cell structure for a secondary battery of claim 8, wherein
    the electrode tabs comprise:
        a first electrode tab extending from the first electrode; and
        a second electrode tab extending from the second electrode, and
    the lead tabs comprise:
        a first lead tab electrically connected to the first electrode tab; and
        a second lead tab electrically connected to the second electrode tab.

10. The cell structure for a secondary battery of claim 9, wherein the first lead tab and the second lead tab are in contact with a same surface of the electrode assembly.

11. The cell structure for a secondary battery of claim 9, wherein the first lead tab and the second lead tab are in contact with different surfaces of the electrode assembly, respectively.

12. The cell structure for a secondary battery of claim 8, wherein at least one of the first electrode, the second electrode and the separation film is partially bound by a binding member.

13. A secondary battery comprising:
    an exterior member; and
    a cell structure disposed in the exterior member,
    wherein the cell structure comprises:
        an electrode assembly comprising a plurality of electrodes;
        a plurality of electrode tabs extending from the electrodes to an outside of the electrode assembly; and
        a plurality of lead tabs electrically connected to the electrode tabs and contacting the electrode assembly,
        wherein a part of each of the lead tabs is folded, and
        wherein the electrode assembly and the folded part of each of the lead tabs overlap each other when viewed from a plan view in a thickness direction of the electrode assembly.

14. The secondary battery of claim 13, further comprising:
    a fixing unit which fixes the lead tabs to a contact surface of the electrode assembly contacting the lead tabs.

15. The secondary battery of claim 13, wherein
    the electrode tabs are inserted into the folded part of each of the lead tabs.

16. The secondary battery of claim 13, wherein each of the electrode tabs is folded at least once.

* * * * *